(12) United States Patent
Yu

(10) Patent No.: US 7,303,332 B2
(45) Date of Patent: Dec. 4, 2007

(54) DEFLECTABLE PROBE AND THERMOMETER

(75) Inventor: Chu Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 99 days.

(21) Appl. No.: 11/273,556

(22) Filed: Nov. 14, 2005

(65) Prior Publication Data

US 2006/0076669 A1    Apr. 13, 2006

Related U.S. Application Data

(63) Continuation-in-part of application No. 10/788,806, filed on Feb. 27, 2004, now Pat. No. 6,979,122.

(60) Provisional application No. 60/498,780, filed on Aug. 29, 2003.

(51) Int. Cl.
*G01K 1/00* (2006.01)
*G01K 1/14* (2006.01)

(52) U.S. Cl. ................ 374/208; 374/163; 600/474; 600/549

(58) Field of Classification Search ................ 374/208, 374/163, 170; 600/549, 474
See application file for complete search history.

(56) References Cited

U.S. PATENT DOCUMENTS

| | | | |
|---|---|---|---|
| 3,504,544 A * | 4/1970 | Tymkewicz | .............. 374/155 |
| 3,788,143 A * | 1/1974 | Gabriel | .............. 374/144 |
| 3,884,219 A * | 5/1975 | Richardson et al. | ........ 600/537 |
| 4,321,827 A * | 3/1982 | Anderson | .............. 374/183 |
| 4,765,014 A | 8/1988 | Moss et al. | |
| 4,821,417 A | 4/1989 | Levine | |
| 4,955,136 A | 9/1990 | Diaz-Rivera | |
| 5,133,606 A | 7/1992 | Zaragoza et al. | |
| 5,397,304 A | 3/1995 | Truckai | |
| 5,458,121 A | 10/1995 | Harada | |
| 5,479,951 A | 1/1996 | Denebeim | |
| 5,728,091 A | 3/1998 | Payne et al. | |
| 6,406,182 B1 | 6/2002 | Chen | |
| 6,500,172 B1 * | 12/2002 | Panescu et al. | .............. 606/31 |
| 6,637,935 B2 | 10/2003 | Chen | |
| 7,036,984 B2 * | 5/2006 | Penney et al. | .............. 374/208 |
| 7,052,471 B2 * | 5/2006 | Lussier et al. | .............. 600/549 |
| 2002/0081552 A1 | 6/2002 | Stanwich et al. | |
| 2003/0212339 A1 | 11/2003 | Lussier et al. | |
| 2003/0212340 A1 | 11/2003 | Lussier et al. | |
| 2004/0141543 A1 * | 7/2004 | Jensen et al. | .............. 374/142 |
| 2004/0181243 A1 | 9/2004 | Chu et al. | |
| 2004/0264546 A1 | 12/2004 | Wong et al. | |

* cited by examiner

*Primary Examiner*—Gail Verbitsky
(74) *Attorney, Agent, or Firm*—Thomas, Kayden, Horstemeyer & Risley

(57) ABSTRACT

A deflectable probe for use in a thermometer. The deflectable probe is constituted by a bendable probe body and a hollow tip member secured thereto. Furthermore, a deflectable member includes a main portion disposed in the bendable probe body. When the bendable probe body is subjected to a force, deformation of the main portion occurs. In particular, the deformation cannot be undone by a return force from the bendable probe body when the applied force is removed, so that the bendable probe body is sustained in a bent form. A space is formed between the hollow pipe and the main portion of the deflectable member for deformation of the main portion to prevent the deflectable member being easily pushed into the hollow cavity and avoid the lead wires being easily cut off.

21 Claims, 9 Drawing Sheets

DEFLECTABLE PROBE AND THERMOMETER

CROSS-REFERENCE TO RELATED APPLICATION

The present application is a continuation-in-part of U.S. patent application Ser. No. 10/788,806, filed on Feb. 27, 2004 now U.S. Pat. No. 6,979,122, which claimed priority to provisional application Ser. No. 60/498,780, filed on Aug. 29, 2003.

BACKGROUND OF THE INVENTION

1. Field of the Invention

The invention relates to the field of thermometers, and more particularly to the field of medical thermometers employing a thermal probe for measurement of a patient's temperature, although it is equally applicable to other temperature measurement fields.

2. Description of the Related Art

Electronic thermometers generally offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

However, most probes used in existing electronic thermometers are rigid thereby presenting a danger of injury to the patient, especially in the case of small children where the thermometer is generally used rectally. U.S. Pat. No. 3,946,613 discloses an electronic thermometer with a flexible probe which is safe and not a danger to patients, particularly children. Because the prior-art probes are not deflectable, they nonetheless tend to recover their original shapes and remain straight with the thermometer body. The lack of the capability of being deflected is very annoying when a body cavity being measured cannot accommodate the longitudinal dimension of the flexible probe. Another disadvantage is that the flexible probe's shape cannot be well adapted to the body cavity being measured for bed-bound patients or children.

SUMMARY OF THE INVENTION

An exemplary embodiment of the present invention overcomes the above-described problems by providing a deflectable thermometer probe comprising a bendable probe body and a tip member secured to the bendable probe body. A thermal sensor is mounted on the inside of a thermal contact surface of the tip member for sensing the temperature of the thermal contact surface and producing a temperature signal. A set of lead wires is coupled to the thermal sensor for transmission of the temperature signal. A deflectable member has a main portion disposed in the bendable probe body, wherein deformation of the main portion occurs when the bendable probe body is subjected to a force, and the deformation cannot be undone by a return force from the bendable probe body when the applied force is removed, thereby the bendable probe body is sustained in a bent form. And a protective film covers the deflectable member.

An exemplary embodiment of the present invention provides a deflectable thermometer probe comprising a bendable probe body and a tip member secured to the bendable probe body. A thermal sensor is mounted on the inside of a thermal contact surface of the tip member for sensing the temperature of the thermal contact surface and producing a temperature signal. A set of lead wires is coupled to the thermal sensor for transmission of the temperature signal. And a deflectable member is disposed within a sidewall portion of the bendable probe body to avoid the deflectable member cutting off the lead wires, wherein deformation of the main portion occurs when the bendable probe body is subjected to a force, and the deformation cannot be undone by a return force from the bendable probe body when the applied force is removed, thereby the bendable probe body is sustained in a bent form.

An exemplary embodiment of the present invention provides a deflectable thermometer comprising a body member including a bendable probe portion and a display portion. A tip member is secured to the bendable probe portion and has a thermal contact surface. A thermal sensor is mounted on the inside of the thermal contact surface of the tip member for sensing the temperature of the thermal contact surface and producing a temperature signal. A set of lead wires is coupled to the thermal sensor for transmission of the temperature signal. A deflectable member has a main body portion disposed in the bendable probe body, wherein deformation of the main body portion occurs when the bendable probe body is subjected to a force, and the deformation cannot be undone by a return force from the bendable probe body when the applied force is removed, thereby the bendable probe body is sustained in a bent form. And a display unit is dispose in the display portion and connected to the lead wires to receive the temperature signal for display of a corresponding temperature reading. The deflectable member is firmly fixed to an area of the display portion or the display unit.

An exemplary embodiment of the present invention provides a deflectable thermometer probe comprising a bendable probe body including a hollow pipe. A tip member with a hollow cavity is secured to the bendable probe body and has a thermal contact surface. A thermal sensor is mounted on the inside of the thermal contact surface of the tip member for sensing the temperature of the thermal contact surface and producing a temperature signal. A set of lead wires is coupled to the thermal sensor for transmission of the temperature signal. And a deflectable member has a main portion disposed in the hollow pipe of the bendable probe body, wherein deformation of the main portion occurs when the bendable probe body is subjected to a force, and the deformation cannot be undone by a return force from the bendable probe body when the applied force is removed, thereby the bendable probe body is sustained in a bent form. A space is formed between the hollow pipe and the main portion of the deflectable member for deformation of the main portion to prevent the deflectable member being easily pushed into the hollow cavity and avoid the lead wires being easily cut off.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1A:
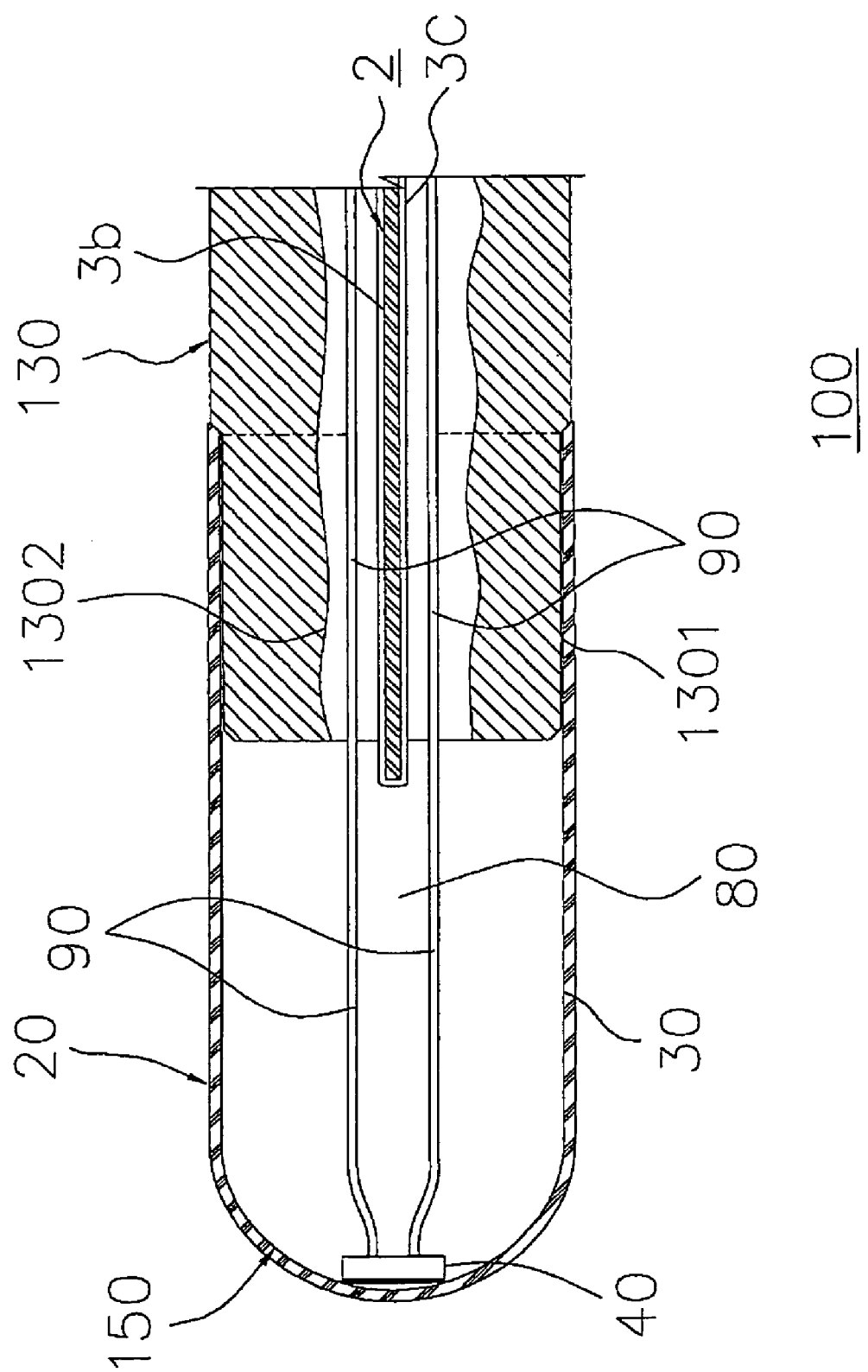
FIG. 1A is an enlarged cross-sectional view of a deflectable probe according to an exemplary embodiment of the invention.

Referring to FIG. 1A, a deflectable probe 100 is composed of a bendable probe body 130 and a hollow tip member 20 secured to the probe body 130. The bendable probe body 130 is typically made of a plastic or rubber material. The hollow tip member 20 includes a thermal contact surface 30 surrounding a hollow cavity 80. In one embodiment, the hollow tip member 20 is preferably made of metal with high thermal conductivity, such as stainless steel.

A thermal sensor 40 is placed at the end 150 of the hollow tip member 20 and mounted on the inside of the thermal contact surface 30. The thermal sensor 40 is capable of sensing the temperature of the thermal contact surface 30 to yield a temperature signal. There are a set of lead wires 90 coupled to the thermal sensor 40 for transmission of the temperature signal.

A deflectable member designated numeral 2 in FIG. 1A includes a main portion 3b disposed in the bendable probe body 130. When the bendable probe body 130 is subjected to a force, deformation of the main portion 3b occurs. When the applied force is removed, the deformation cannot be undone by a return force from the bendable probe body 130. Thus, the bendable probe body 130 is sustained in a bent form after release of the force.

Further, the bendable probe body 130 includes a hollow pipe 1302 to hold the deflectable metal wire 2. The lead wires 90 are also designed to run through the hollow pipe 1302. Note that the main portion 3b of the deflectable member 2 is constructed by a deflectable metal wire 2 which is made of deflectable metal like copper. Preferably, the deflectable member 2 may be covered by a protective film 3C to avoid the deflectable member 2 cutting off the lead wires 90. Typically, the protective film 3C is made of soft material such as rubber.

Figure 1B:
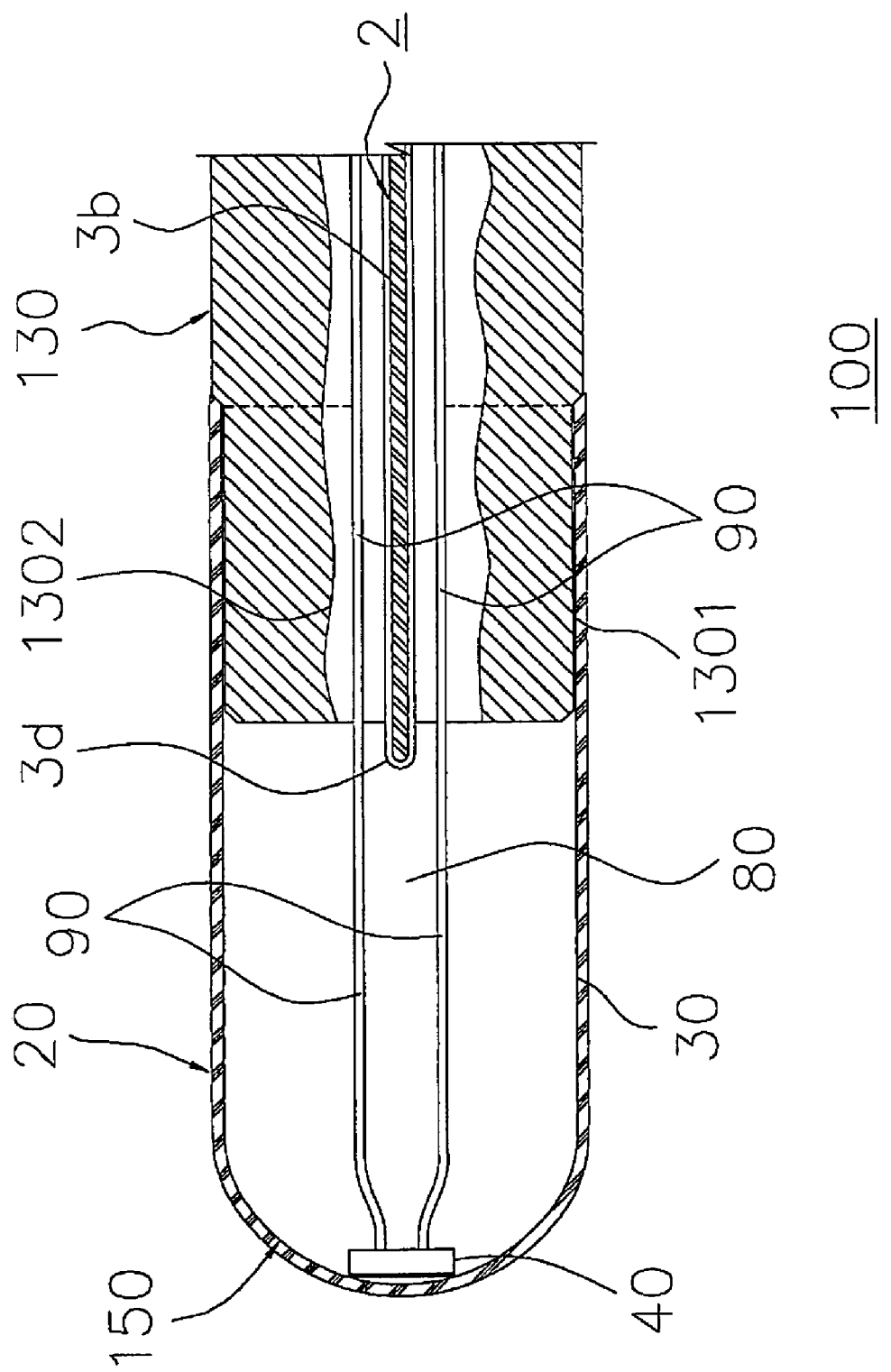
FIG. 1B is an enlarged cross-sectional view of a deflectable probe according to an exemplary embodiment of the invention.

Turning to FIG. 1B, a front end 3d of the deflectable member 2 is preferably made in the form of a round shape and closed at a smooth, domed, hemispherical or hemiellipsoid shaped end to avoid the deflectable member 2 cutting off the lead wires 90.

Figure 1C:
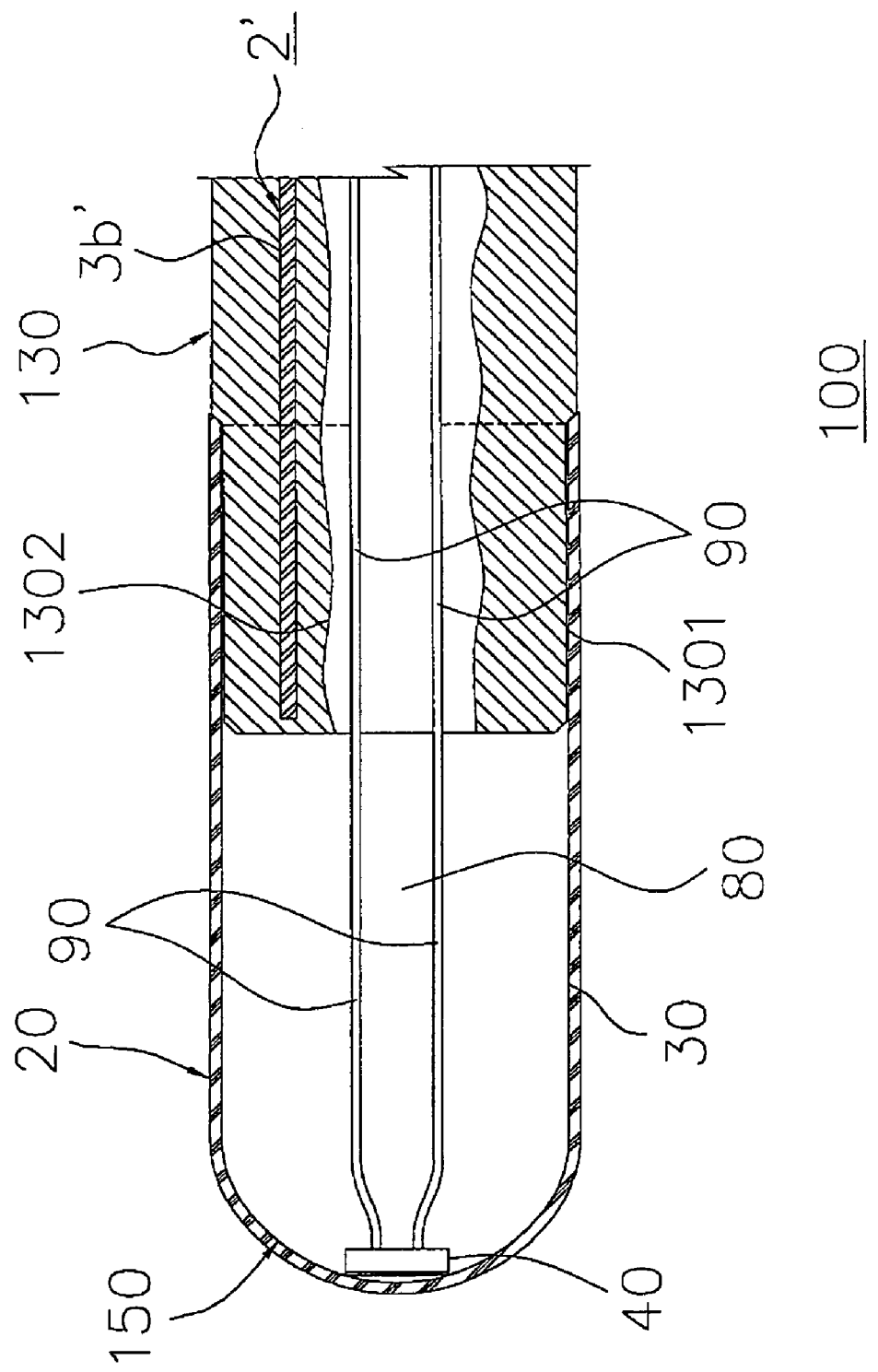
FIG. 1C is an enlarged cross-sectional view of a deflectable probe according to an exemplary embodiment of the invention.

Referring to FIG. 1C, an embodiment of a bendable probe body is illustrated. A deflectable member 2' may be disposed within a sidewall portion of the bendable probe body 130 to avoid cutting off the lead wires 90. Typically, the deflectable member 2' may be sealed by the sidewall portion of the bendable probe body 130. Therefore, a main portion 3b' of the deflectable member 2' and the bendable probe body 130 could be easily sustained in the same bent form since there is no gap existing between the bendable probe body 130 and the deflectable member 2'.

Note that the bendable probe body 130 is preferably injection molded plastic. Plastic injection molding is the primary process for manufacturing the bendable probe body 130, for example, which includes taking plastic in the form of pellets or granules and heating this material until a melt is obtained. Then the deflectable member 2' is put into the melt and the melt with the deflectable member 2' is forced into a split-die chamber/mold where it is allowed to cool into the desired shape. The mold is then opened and the bendable probe body 130 is ejected.

Referring again to FIG. 1A, a recess 1301 is defined in the outer surface of the bendable probe body's front end portion. The back end portion of the hollow tip member 20 has its inner surface adapted to receive the recess 1301 of the bendable probe body 130 for formation of a lap joint.

Figure 2A:
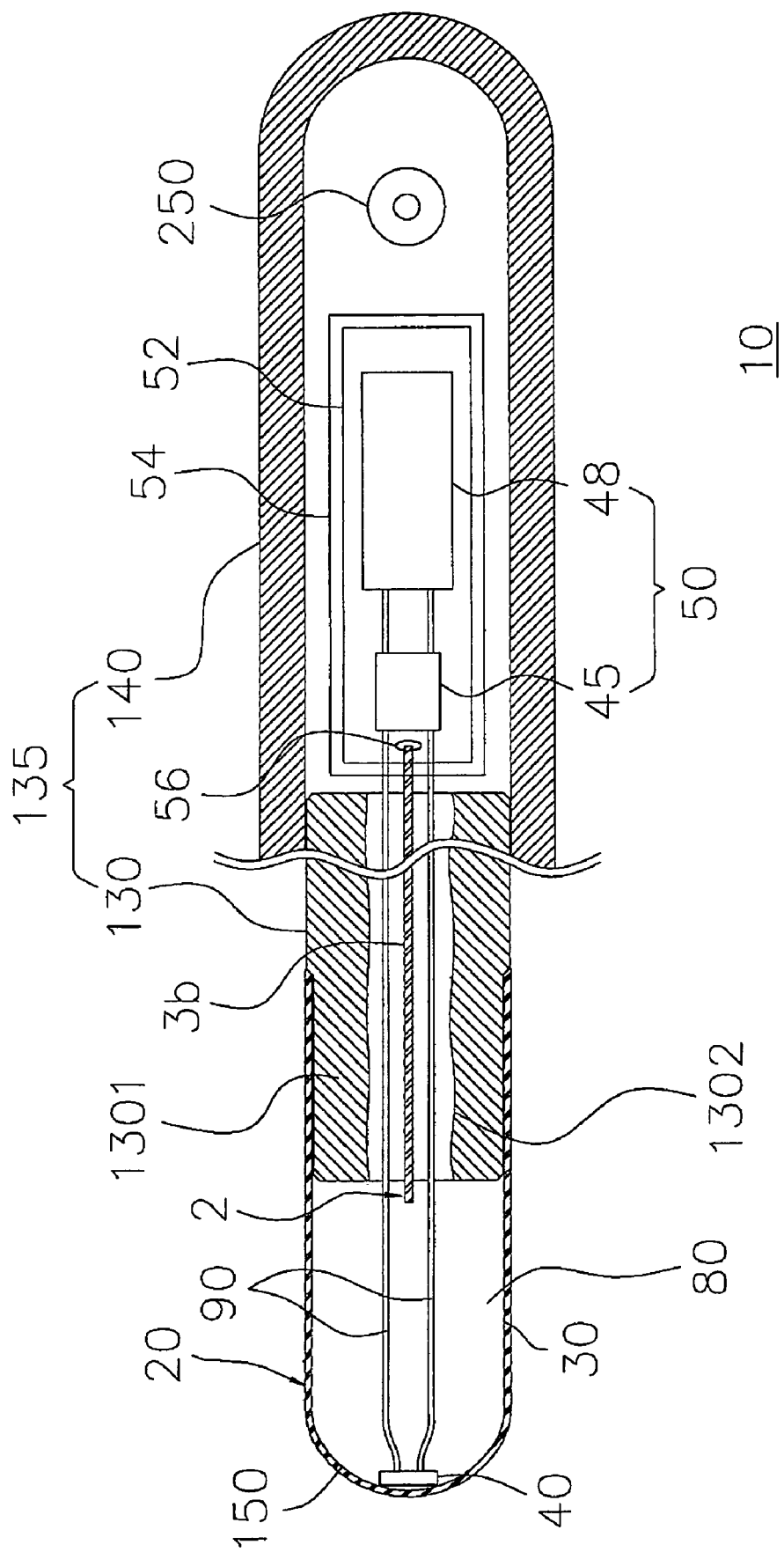
FIG. 2A is a fragmentary cross-sectional view of a thermometer according to an exemplary embodiment of the invention.

Referring to FIG. 2A, an embodiment of a thermometer having a deflectable probe is illustrated. The thermometer 10 is made up of a body member 135 and a hollow tip member 20. In FIG. 2, the hollow tip member 20 is shown in an enlarged view for detailed description. The body member 135 includes a bendable probe body 130 and a display portion 140. The hollow tip member 20 is secured to the bendable probe body 130 of the body member 135; it contains a thermal contact surface 30 surrounding a hollow cavity 80. In one embodiment, the hollow tip member 20 is preferably made of metal with good thermal conductivity, such as stainless steel.

A thermal sensor 40 is placed at the end 150 of the hollow tip member 20 and mounted on the inside of the thermal contact surface 30. The thermal sensor 40 senses the temperature of the thermal contact surface 30 and produces a temperature signal. There are a set of lead wires 90 coupled to the thermal sensor 40 for transmission of the temperature signal.

The display portion 140 comprises a display unit 50 and a base plate 54 for supporting the display unit 50 which comprises a substrate 52 and a display 48, such as LCD panel, disposed thereon and circuitry 45 coupled to the display 48. The circuitry 45 is connected to the lead wires 90 to receive the temperature signal; it drives the display 48 to show a corresponding temperature reading. Typically, the base plate 54 is plastic and the substrate is PCB board. The thermometer 10 also includes a switch 250 to turn on and off the display unit 50.

Figure 3:
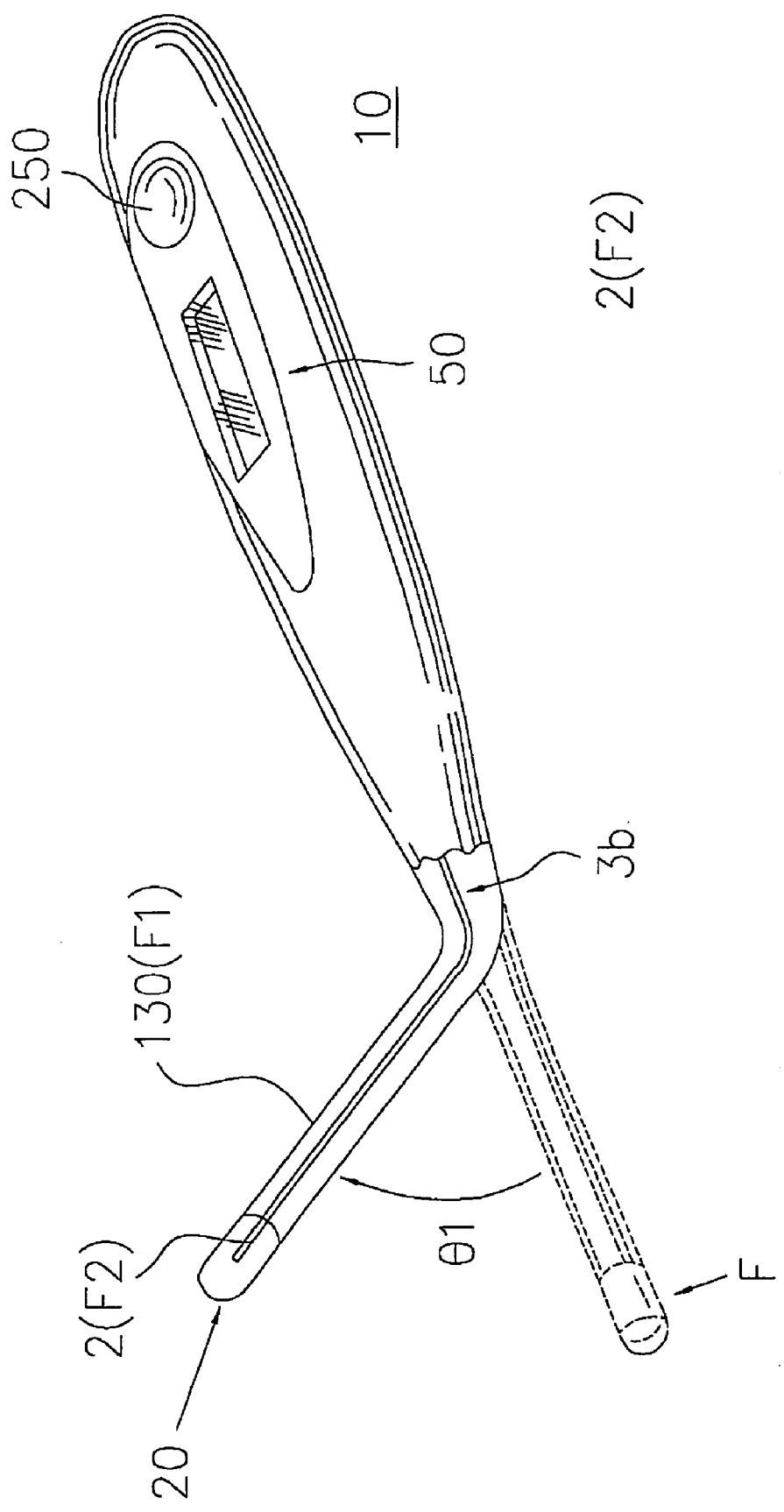
FIG. 3 is perspective view of the thermometer according to an exemplary embodiment of the invention, where the bendable probe body is subjected to a sufficient force.

The features of the embodiment will now be described in FIG. 3. A deflectable member 2 includes a main portion 3b disposed in the bendable probe body 130. When the bendable probe body 130 is subjected to a force F, deformation of the main portion 3b occurs. As shown in FIG. 3, the main portion 3b is deformed by a deflection angle of θ1. When the applied force F is removed, the deformation cannot be undone by a return force F1 from the bendable probe body 130. As a result, the bendable probe body 130 is sustained in a bent form after release of the force F. Note that the main portion 3b of the deflectable member 2 is constructed by a deflectable metal wire 2 which is made of deflectable metal like copper.

Referring again to FIG. 2A, a recess 1301 is defined in the outer surface of the bendable probe body's front end. The back end portion of the hollow tip member 20 has its inner surface adapted to receive the recess 1301 of the bendable probe body 130 for formation of a lap joint.

According to the embodiment, the hollow tip member 20 is preferably made of thin metal with good thermal conductivity, such as silver, platinum, or stainless steel. The hollow tip member 20 is made in the form of a tubular shape and closed at a domed, hemispherical or hemiellipsoid shaped end. The hollow tip member 20 also includes a thermal contact surface 30 surrounding a hollow cavity 80. The contact surface 30 is brought in contact with flesh of a patient so that heat can be transferred from the patient's flesh to the hollow tip member 20. In one embodiment, the thermal sensor 40 is thermistor. The lead wires 90 and the thermistor 40 are both adhered on the inside of the thermal contact surface 30 with heat conductive glue. The glue is an insulating material with good thermal conductivity, e.g., epoxy resin. Moreover, the lead wires 90 are made up of a pair of electrical lead wires; they are used to connect the thermal sensor 40 to the circuitry 45.

However, the lead wires 90 might be easily to be cut off when the deflectable metal wire 2 is pushed into the hollow cavity 80 since a deformation space between the hollow pipe and the deflectable metal wire 2 is not enough. To overcome the aforementioned issue, the hollow pipe provides a space 1303 for the deformation of the main portion of the deflectable member to prevent the deflectable member 2 being easily pushed into the hollow cavity 80. To enhance the effect, the deflectable member 2 can be firmly fixed to a predetermined area 56 of the display portion 140, for example, the base plate 54 or the substrate 52 as FIG. 2A.

Figure 2B:
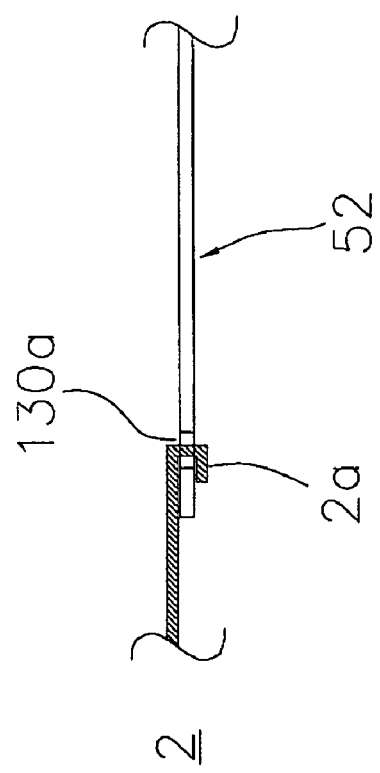
FIG. 2B is fragmentary cross-sectional view of a deflectable member fixed to a display portion of the thermometer of FIG. 2A according to an exemplary embodiment of the invention.

Referring to FIG. 2B, a hole 130a is preferably defined in the area 56 of the base plate 54 or the substrate 52 while a corresponding hook 2a is formed at an end of the deflectable metal wire 2. The hook 2a can embed itself in the hole 130a to firmly fix the deflectable metal wire 2.

Figure 2C:
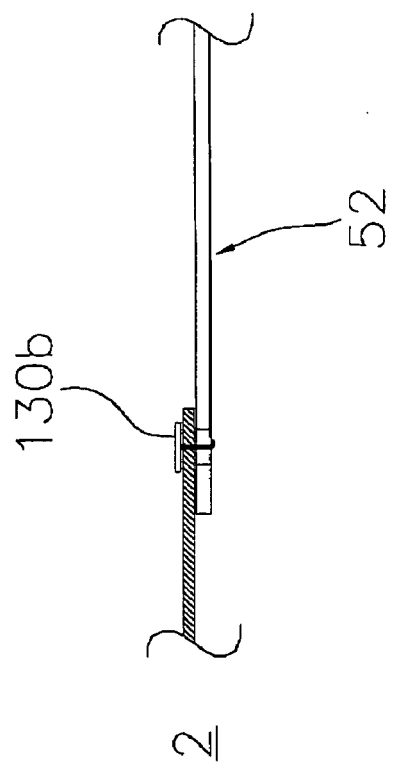
FIG. 2C is fragmentary cross-sectional view of a deflectable member fixed to a display portion of the thermometer of FIG. 2A according to an exemplary embodiment of the invention.

Referring to FIG. 2C, a lock unit 130b is adapted to firmly fix the deflectable metal wire 2 to the display portion 140. Typically, the lock unit 130b may be a fastener, screw, nail, or bolt. For example, a hole is preferably defined in the area 56 of the base plate 54 or the substrate 52 when the screw inserts into the hole and firmly fixes an end of the deflectable metal wire 2.

Figure 5:
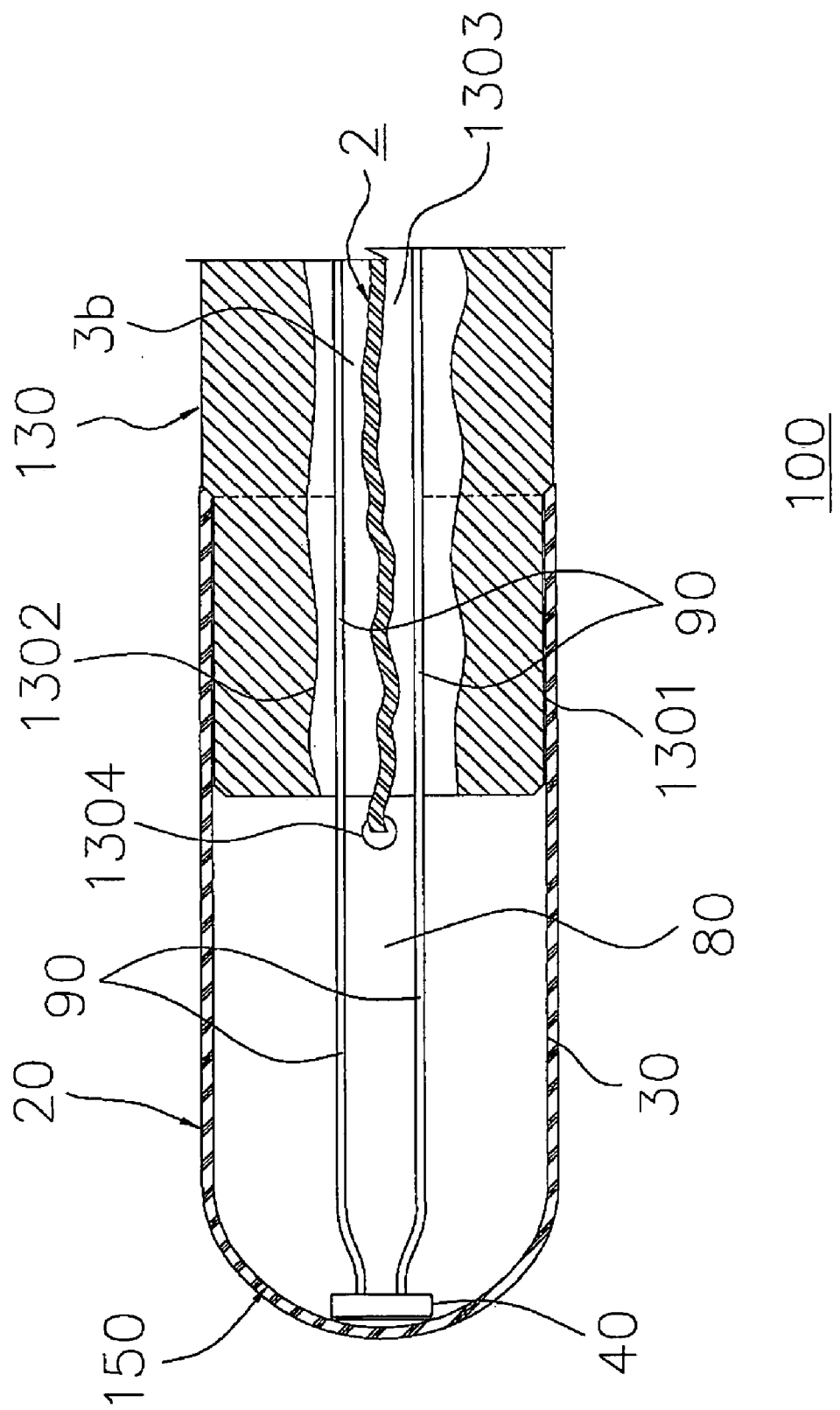
FIG. 5 is an enlarged cross-sectional view of a deflectable probe according to an exemplary embodiment of the invention.
Figure 6:
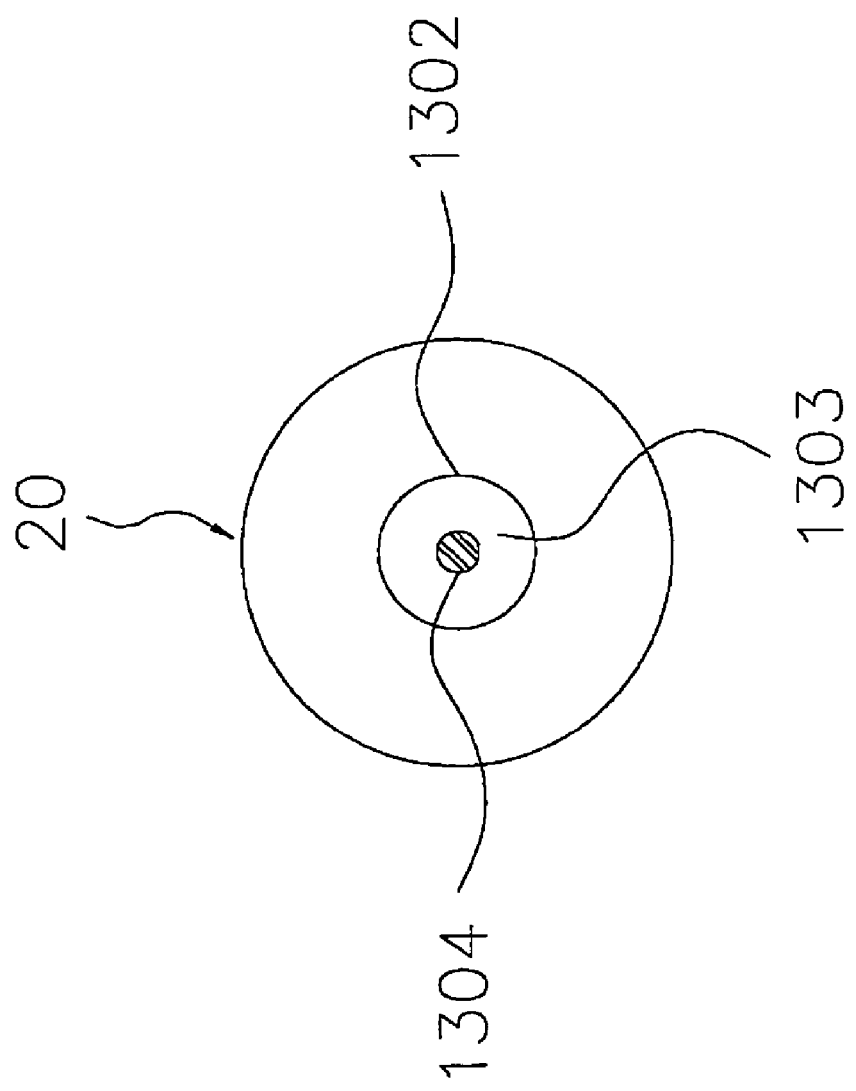
FIG. 6 is a side cross-sectional view of a bendable probe body of FIG. 5.

Referring to FIG. 5 and FIG. 6, preferably, the hollow pipe 1302 has at least a portion with a diameter greater than that of the main portion 3b of the deflectable member 2. Therefore, a space 1303 formed between the hollow pipe 20 and the main portion 3b of the deflectable member 2 for deformation of the main portion 3b is enough to prevent the deflectable member 2 from being pushed into the hollow cavity 80 and thereby avoiding the lead wires 90 being cut off. In one example, the hollow pipe 1302 and the main portion 3b of the deflectable member 2 are dimensioned to define an annular, concentric space between the hollow pipe 1302 and the main portion 3b of the deflectable member 2. Therefore, a possibility of cutting off the lead wires 90 is decreased if the lead wires 90 are disposed on the inner wall of the hollow pipe 1302. In another example, the main portion 3b of the deflectable member 2 may be disposed on one side of the hollow pipe 1302, and thus the lead wires 90 may be disposed in the center region of the hollow pipe or disposed on the opposite side thereof.

Figure 4:
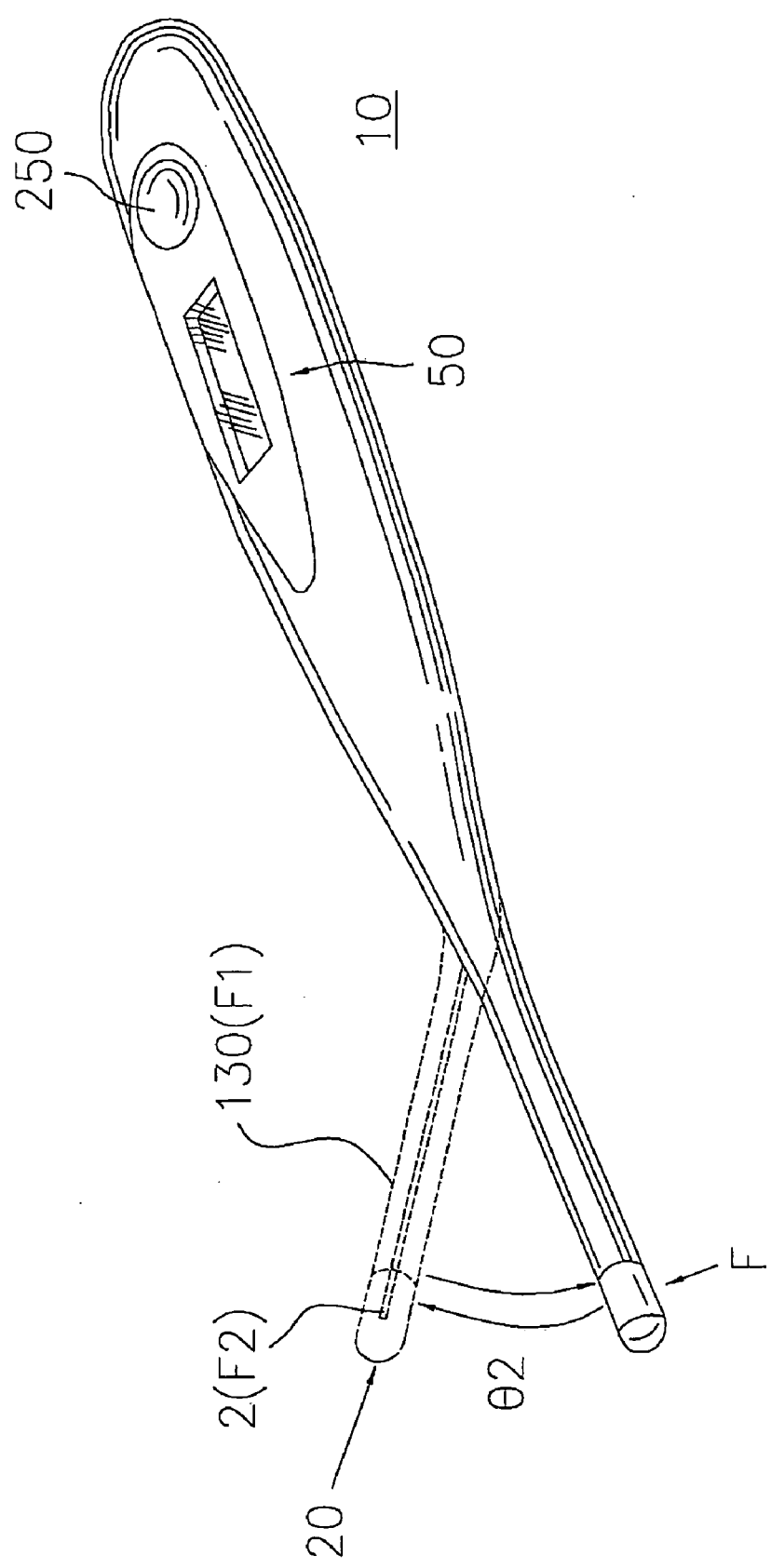
FIG. 4 is perspective view of the thermometer according to an exemplary embodiment of the invention, where the bendable probe body is subjected to an insufficient force.

From FIG. 3 and FIG. 4, it can be seen that deformation of the main portion 3b occurs when the bendable probe body 130 is subjected to a force F. Consequently, the main portion 3b is deformed by a deflection angle of θ1. Because a deflection force F2 is greater than a return force F1 from the bendable probe body 130, the deflection angle of θ1 cannot be undone by the return force F1 when the applied force F is removed. As a result, the bendable probe body 130 is sustained in a bent form after release of the force F.

In contrast, the main portion 3b is deflected by a smaller angle of θ2 if the applied force F is insufficient. In this case, the deflection force F2 is less than the return force F1 from the bendable probe body 130, so the deflection angle of θ2 can be undone by the return force F1 when the applied force F is removed. Therefore, the bendable probe body 130 goes back to its original shape after release of the force F.

In view of the above, the use of a deflectable member allows the thermometer probe of the invention to be well adapted to a patient's body cavity being measured. Additionally, the deflectable member is preferably made of a metal wire having a diameter of about 0.5 to 2.0 mm. Hence, the thermometer probe of the invention can be easily deflected and sustained in a bent form, thereby enhancing the probe life.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A deflectable thermometer probe comprising:
   a bendable probe body;
   a tip member secured to the bendable probe body and having a hollow cavity and a thermal contact surface;
   a thermal sensor mounted on the inside of the thermal contact surface of the tip member, for sensing the temperature of the thermal contact surface and producing a temperature signal;
   a set of lead wires, disposed in the hollow cavity and a space surrounded by an inner wall of the bendable probe body, and coupled to the thermal sensor for transmission of the temperature signal;
   a deflectable member having a main portion disposed in the bendable probe body, such that deformation of the main portion occurs when the bendable probe body is subjected to a force, and the deformation cannot be undone by a return force from the bendable probe body when the applied force is removed, thereby the bendable probe body is sustained in a bent form; and
   a protective film, disposed in the same space surrounded by the inner wall of the bendable probe body, directly covering the deflectable member to avoid at least a portion of the deflectable member touching the set of lead wires.

2. The probe as recited in claim 1 wherein the main portion of the deflectable member is constructed by a deflectable metal wire.

3. The probe as recited in claim 2 wherein the deflectable metal wire is made of copper.

4. The probe as recited in claim 1 wherein the protective film is made of soft material.

5. The probe as recited in claim 1 wherein the protective film is made of rubber.

6. A deflectable thermometer probe comprising:

a bendable probe body;

a tip member secured to the bendable probe body and having a thermal contact surface;

a thermal sensor mounted on the inside of the thermal contact surface of the tip member, for sensing the temperature of the thermal contact surface and producing a temperature signal;

a set of lead wires, disposed in a space surrounded by an inner wall of the bendable probe body and coupled to the thermal sensor for transmission of the temperature signal; and at least a frond end of a deflectable member being completely buried and sealed in the inner wall of the bendable probe body and apart from the space to avoid at least the frond end of the deflectable member touching the lead wires, such that deformation of the main portion occurs when the bendable probe body is subjected to a force, and the deformation cannot be undone by a return force from the bendable probe body when the applied force is removed, thereby the bendable probe body is sustained in a bent form.

7. The probe as recited in claim 6 wherein the deflectable member is constructed by a deflectable metal wire.

8. The probe as recited in claim 7 wherein the deflectable metal wire is made of copper.

9. The probe as recited in claim 6 wherein the deflectable member is sealed within the inner wall of the bendable probe body such that there is no gap existing therebetween.

10. A deflectable thermometer comprising:

a body member including a bendable probe body and a display portion;

a tip member secured to the bendable probe body and having a hollow cavity and a thermal contact surface;

a thermal sensor mounted on the inside of the thermal contact surface of the tip member, for sensing the temperature of the thermal contact surface and producing a temperature signal;

a set of lead wires, disposed in the hollow cavity and a space surrounded by an inner wall of the bendable probe body, and coupled to the thermal sensor for transmission of the temperature signal;

a deflectable member having a main body portion disposed in the same space surrounded by the inner wall of the bendable probe body, such that deformation of the main body portion occurs when the bendable probe body is subjected to a force, and the deformation cannot be undone by a return force from the bendable probe body when the applied force is removed, thereby the bendable probe body is sustained in a bent form; and a display unit disposed in the display portion and connected to the lead wires to receive the temperature signal for display of a corresponding temperature reading;

wherein the deflectable member is mechanically fixed to an area of the display portion or the display unit to prevent a front end of the deflectable member being further pushed into the hollow cavity.

11. The thermometer as recited in claim 10 wherein the deflectable member is constructed by a deflectable metal wire.

12. The thermometer as recited in claim 11 wherein the deflectable metal wire is made of copper.

13. The thermometer as recited in claim 10 wherein the display portion comprises a base plate for supporting the display unit.

14. The thermometer as recited in claim 13 wherein the base plate is plastic.

15. The thermometer as recited in claim 13 wherein the display unit comprises:

a substrate; and a display disposed on the substrate.

16. The thermometer as recited in claim 15 wherein the substrate is PCB board.

17. The thermometer as recited in claim 15 wherein the deflectable member is firmly fixed to the substrate or the base plate.

18. The thermometer as recited in claim 17 wherein a hole is defined in the base plate or the substrate while a corresponding hook formed at an end of the deflectable member is embedded in the hole.

19. The thermometer as recited in claim 17 wherein a lock unit is adapted to firmly fix the deflectable member to the base plate or the substrate.

20. The thermometer as recited in claim 19 wherein the lock unit is a fastener, screw, nail, or bolt.

21. The thermometer as recited in claim 20 wherein a hole is defined in the base plate or the substrate when the screw inserts into the hole and firmly fixes an end of the deflectable member.

* * * * *